Figure 1:
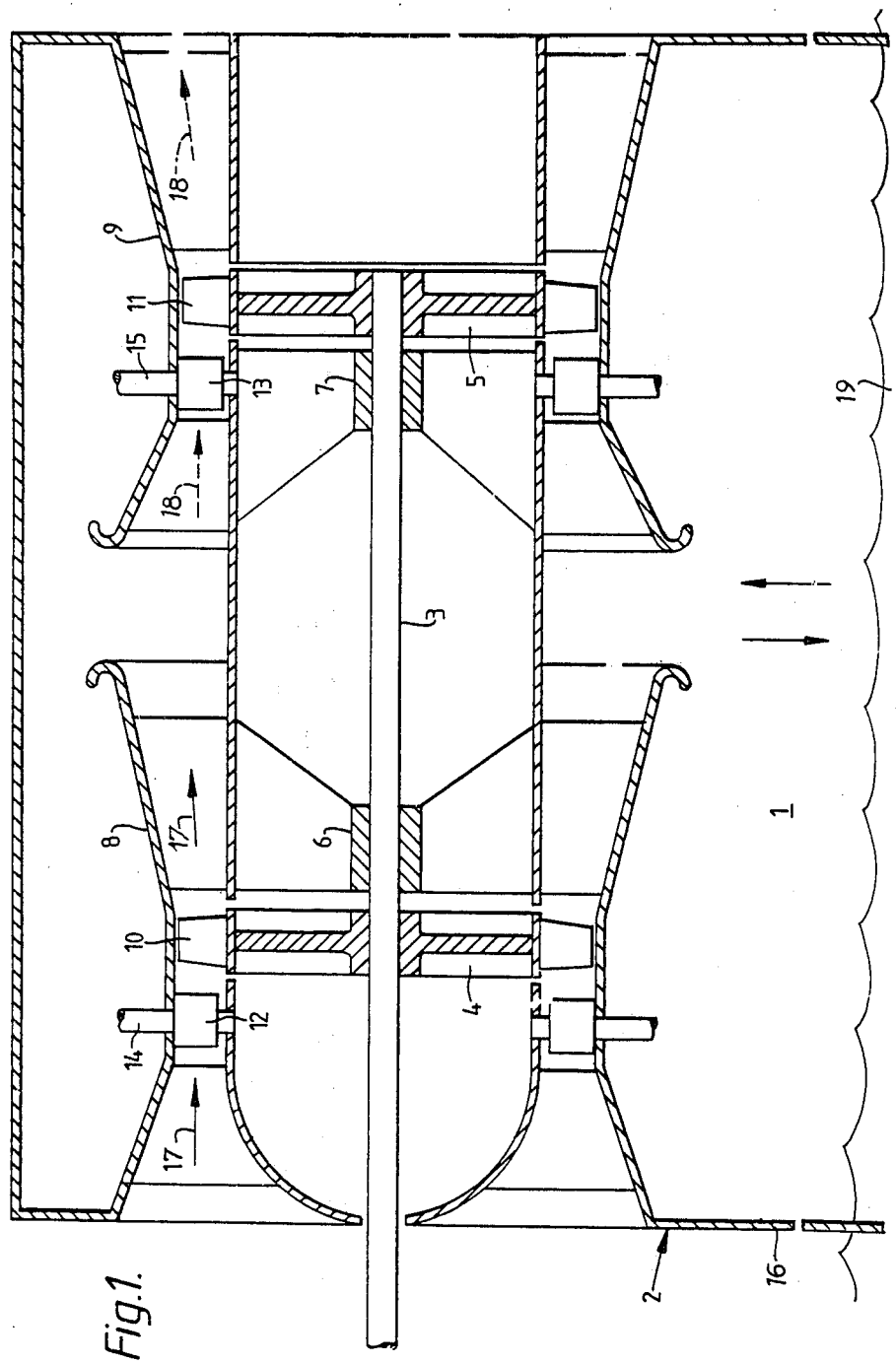

United States Patent [19]

Lee

[11] 4,385,492

[45] May 31, 1983

[54] TURBINE

[75] Inventor: Alan S. Lee, Leicester, England

[73] Assignee: The English Electric Company Limited, London, England

[21] Appl. No.: 188,065

[22] Filed: Sep. 17, 1980

[30] Foreign Application Priority Data

Sep. 20, 1979 [GB] United Kingdom ................. 7932681

[51] Int. Cl.³ ............................................ F03B 13/12
[52] U.S. Cl. ....................................... 60/398; 60/502
[58] Field of Search ......................... 60/398, 497, 502;
290/42, 53; 415/4

[56] References Cited

U.S. PATENT DOCUMENTS 1,267,936  5/1918  Tuch .................................... 60/398
3,214,915  11/1965  Weibel ................................. 60/398
3,925,986  12/1975  Barwick .............................. 60/398

Primary Examiner—Allen M. Ostrager
Assistant Examiner—Stephen F. Husar
Attorney, Agent, or Firm—Kirschstein, Kirschstein, Ottinger & Cobrin

[57] ABSTRACT

This invention relates to turbines which are arranged to be driven by an oscillating flow of working fluid especially by movement of air above a naturally moving body of water. Conventional turbines require four valves to direct an oscillating flow of fluid to cause continuous unidirectional turning of a single rotor.

According to this invention a turbine having two spaced arrays of rotor blades (10, 11) mounted on a common shaft (3), a common passage (1) for working fluid communicating with the space between the rotor blades, an inlet (17) for the working fluid to said space and passage through one array of rotor blades (10), an outlet (18) from the space and passage through the other array of rotor blades (11), an inlet valve (12) substantially preventing working fluid from passing from said space between said one array of rotor blades (10) and an outlet valve (13) substantially preventing working fluid from passing into said space through said other array of rotor blades (11), the blades being arranged so that working fluid passing into and out of said space drives the rotors (4, 5) in the same direction.

The inlet and outlet valves preferably comprise arrays of movable stator blades.

5 Claims, 2 Drawing Figures

TURBINE

This invention relates to turbines which are arranged to be driven by an oscillating flow of a working fluid, which may be in liquid or gaseous form, and is especially though not exclusively, concerned with such turbines in which the rotors are arranged to be driven by a movement of air above a naturally moving body of water.

Conventional turbines having a single rotor suffer from the disadvantage that four valves are required to direct an oscillating flow of fluid so that it causes continuous unidirectional turning of the rotor.

According to the present invention a turbine has two spaced arrays of rotor blades mounted on a common shaft, a common passage for working fluid communicating with the space between the rotor blades, an inlet for the working fluid to said space and passage through one array of rotor blades, an outlet from the space, and passage through the other array of rotor blades, an outlet valve substantially preventing working fluid from passing from the space between said one array of rotor blades, and into the space through said other array of rotor blades, and the blades being arranged so that working fluid passing into and out of said space drives the rotors in the same direction.

A turbine in accordance with this invention requires only two valves for controlling the flow of working fluid.

A turbine in accordance with this invention preferably incorporates an inlet valve comprising an array of stator blades movable into either a first position in which they permit fluid to flow through said one array of rotor blades, or a second position in which the flow is prevented, the movement of the blades being effected automatically depending on the direction of flow of the working fluid through said common passage and said outlet valve preferably comprises an array of stator blades movable into either a first position in which they permit fluid to flow through said other array of rotor blades, or a second position in which the flow is prevented, the movement of the blades being effected automatically depending on the direction of flow of the working fluid through said common passage. Such valves, being close to the rotor blades, are located in a region of high fluid velocity and can therefore be of a significantly smaller size and hence more economical than those of a single rotor system which need to be located in a region of low fluid velocity.

The common passage in a turbine in accordance with this invention may conveniently terminate below the surface of a body of water subject to wave motions. The common passage may therefrom comprise a hollow column, the rotors being disposed at the top of the column and lower end of the column may be submerged in a body of water such as the sea, subject to wave motions so that the movement of the surface of the water produces an oscillating flow of air within said column.

The interior of the column then conveniently constitutes said common passage which communicates with the space between the two arrays of rotor blades, the inlet and outlet respectively drawing air from and expelling air to the atmosphere.

Alternatively the space between the two arrays of rotor blades may communicate with the atmosphere through said passage, the inlet and outlet then being connected to the interior of said hollow column.

The turbine may be used by connecting the turbine shaft to an electrical generator, pump or other rotary device.

Figure 2:
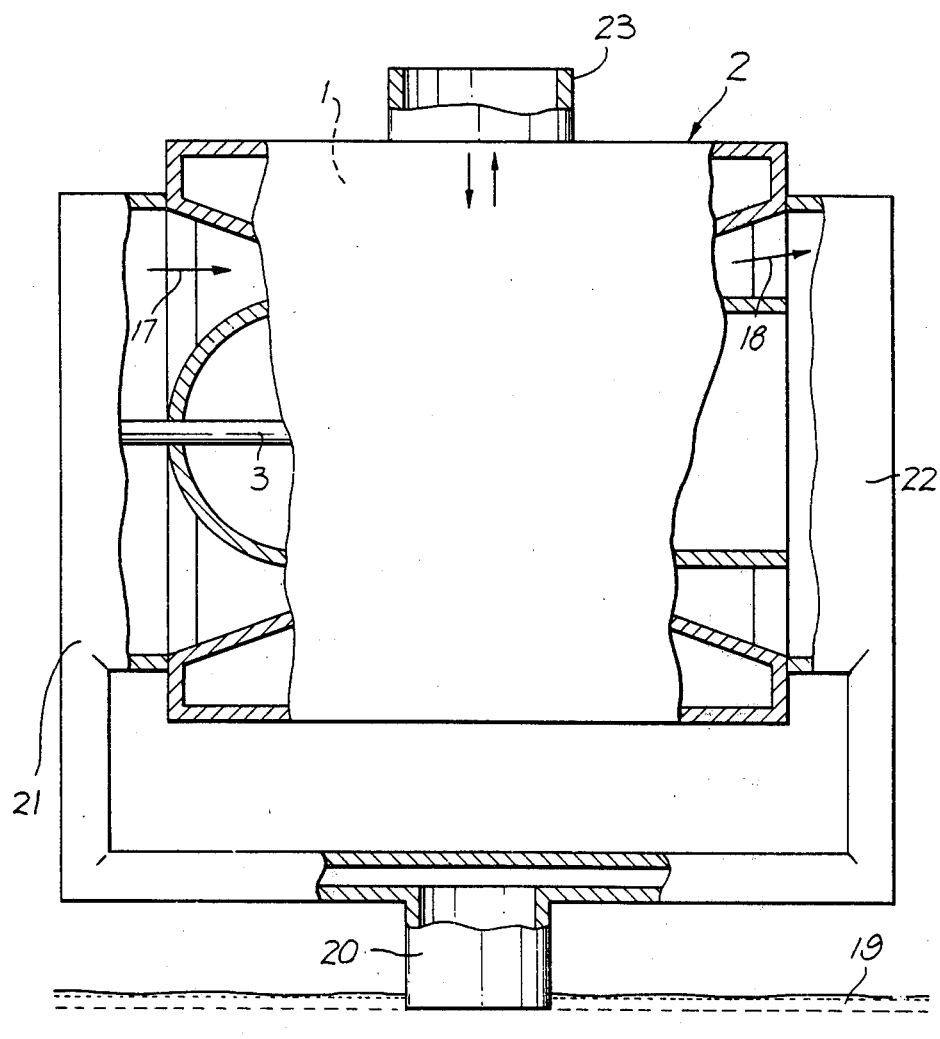

The invention will now be further explained by way of an example with reference to the accompanying schematic drawing of which;

FIG. 1 shows diagrammatically, a sectional view of a turbine in accordance with the present invention, and FIG. 2 is a diagrammatical elevation, partially in section, of a turbine similar to that shown in FIG. 1, but arranged to work in a slightly different manner, Thus referring to FIG. 1, a chamber (1), formed by a casing (2), contains an air column and is located above a hollow vertical shaft (16) (only the upper end of which is shown), the lower end being submerged beneath the surface of an expanse of water (19) subject to wave motion so that water oscillates vertically within the shaft. Two rotors (4,5) are fixed to a common turbine shaft (3) which is free to rotate in bearings (6,7), the bearings being supported by projections from the turbine casings (8,9). A plurality of generally radially extending turbine blades (10,11) is carried by each rotor every blade being arranged in the same direction relative to the common axis of rotation (of both rotors) so that a flow of air in a direction parallel to the axis of rotation urges both rotors to turn in the same direction about said axis. There are two arrays of radially extending stator blades (12,13), each array being axially adjacent to a respective array of rotor blades and situated so that a flow of air passes between the stator blades before passing between the rotor blades.

Each of the stator blades is attached to a radially extending rotatable shaft (14,15), the shafts thus forming two circular arrays. Each shaft is connected to every other shaft in the same array by a convenient device so that all the shafts in a particular array may be rotated simultaneously about their respective axis, causing a corresponding radial rotation of the attached stator blades with the consequence that the stator blades may, depending on their juxtaposition, serve either to restrict the amount of air passing between the adjacent rotor blades, for example in the manner of a shut off valve, or to control the angle of flow of the air approaching the adjacent rotor blades.

When the turbine is in use, a rising wave in the water column below the chamber (1) causes the air pressure in the chamber to rise. The stator blades (12), are caused to rotate automatically by the increased air pressure by means of any convenient form of control device so that the air flow through them is substantially shut off, while the blades (13) remain in an open position. Air then flows from the chamber between the rotor blades (11) to the atmosphere as shown by the arrows (18), causing the rotor (5) to turn, thus driving the turbine shaft (3). When the wave in the water column subsequently falls air pressure in the chamber (1) decreases. The stator blades (12) are caused to rotate from the closed position into an open position so that air is able to flow between them and is directed on to the rotor blades (10). At the same time the stator blades (13) are caused to rotate from the open to the closed position so that the air flow between them is substantially shut off. There is thus a flow of air from the atmosphere, between the rotor blades (10) and into the chamber, thus urging the rotor (4) and the turbine shaft to continue their rotation in the same direction. Continuous rising and falling of waves in the water column causes repetition of this process and the turbine shaft is driven continuously. As energy is extracted from one rotor, the other rotor continues to rotate and the windage losses of the latter rotor represent a loss of energy from the system. However as the stator blades which shut off the air flow through the rotor blades are close to the latter, secondary flows in and out of the rotor blades are minimised and the efficiency of the whole system is high.

In some cases, instead of the turbine having a mechanical device for operating the stator blades in dependence upon the air pressure within the shaft (16), they may be sprung into the closed position and opened directly by air pressure, in the manner of clack valves, as the water level changes.

In an alternative embodiment the stator blades may be omitted and the shutting off of the air flow accomplished by pivoting the rotor blades about respective radial axes by a suitable operating mechanism.

In the arrangment shown in FIG. 2, the inlet to the rotor (4) and outlet to the rotor (5) are connected to pipes (21) and (22) respectively, which in turn are connected to a common passage (20) which extends below the surface of a body of water (19) subject to wave motion. The chamber 1 communicates with the atmosphere via a pipe (23) which is connected to the casing (2) of the turbine. The air flow in the chamber and through the rotors is precisely similar to the air flow shown in FIG. 1, as shown by the arrows 17 and 18.

I claim:

1. An axial-flow turbine having two spaced arrays of rotor blades (10, 11) mounted on a common shaft (3), a common passage (1) for working fluid communicating with the space between the rotor blades, an inlet (17) for the working fluid to said space and passage through one array of rotor blades, an outlet (18) from the space and passage through the other array of rotor blades, an inlet valve (12) substantially preventing working fluid from passing from said space between said one array of rotor blades (10) and an oulet valve (13) substantially preventing working fluid from passing into said space through said other array of rotor blades (11), the blades being oriented in the same sense, whereby working fluid passing into and out of said space drives the rotors (4,5) in the same direction.

2. An axial-flow turbine according to claim 1 wherein said inlet valve (12) comprises an array of stator blades movable into either a first position in which they permit fluid to flow through said one array of rotor blades, or a second position in which the flow is prevented, the movement of the blades being effected automatically depending on the direction of flow of the working fluid through said common passage (1), and said outlet valve (13) comprises an array of stator blades movable into either a first position in which they permit fluid to flow through said other array of rotor blades, or a second position in which the flow is prevented, the movement of the blades being effected automatically depending on the direction of flow of the working fluid through said common passage (1).

3. An axial-flow turbine according to claim 1 wherein said common passage (1) for working fluid terminates below the surface of a body of water subject to wave motions.

4. An axial-flow turbine according to claim 1 wherein said common passage (1) comprises a hollow column (16), the rotors (4,5) being disposed at the top of the column (16) and the lower end of the column being submerged in a body of water subject to wave motions, the inlet and outlet valves (12,13) respectively drawing air from and expelling air to the atmosphere.

5. An axial-flow turbine according to any of claims 1 or 2 wherein said space between the rotor blades (10,11) communicates with the atmosphere through said common passage (1), the inlet and outlet valves (12,13) being connected to the interior of a second passage which terminates below the surface of a body of water subject to wave motions.

* * * * *